US010162719B2

(12) United States Patent
Endo

(10) Patent No.: US 10,162,719 B2
(45) Date of Patent: Dec. 25, 2018

(54) ORDERING DEVICE, DATA PROCESSING DEVICE, ORDERING METHOD, COMPUTER PROGRAM PRODUCT, AND MULTIPLEX SYSTEM

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Kotaro Endo, Fuchu Tokyo (JP)

(73) Assignees: KABUSHIKI KAISHA TOSHIBA, Tokyo (JP); TOSHIBA SOLUTIONS CORPORATION, Kawasaki-Shi (JP)

( * ) Notice: Subject to any disclaimer, the term of this patent is extended or adjusted under 35 U.S.C. 154(b) by 161 days.

(21) Appl. No.: 15/266,073

(22) Filed: Sep. 15, 2016

(65) Prior Publication Data
US 2017/0010943 A1    Jan. 12, 2017

Related U.S. Application Data
(63) Continuation of application No. PCT/JP2014/070625, filed on Aug. 5, 2014.

(51) Int. Cl.
G06F 11/00     (2006.01)
G06F 11/16     (2006.01)
G06F 11/18     (2006.01)

(52) U.S. Cl.
CPC ............ *G06F 11/187* (2013.01); *G06F 11/00* (2013.01); *G06F 11/1629* (2013.01); *G06F 11/18* (2013.01)

(58) Field of Classification Search
CPC ............. G06F 11/1608; G06F 11/1629; G06F 11/1633; G06F 11/1637; G06F 11/18;
(Continued)

(56) References Cited

U.S. PATENT DOCUMENTS 4,907,232 A * 3/1990 Harper .................... G06F 11/18
714/11
5,598,529 A * 1/1997 Garay ................... G06F 11/182
714/11
(Continued)

FOREIGN PATENT DOCUMENTS

JP    2001-051962    2/2001
JP    2002-108639    4/2002
(Continued)

OTHER PUBLICATIONS

International Search Report for International Patent Application No. PCT/JP2014/070625 dated Nov. 11, 2014, 6 pages.
(Continued)

*Primary Examiner* — Gabriel Chu
(74) *Attorney, Agent, or Firm* — Amin, Turocy & Watson LLP

(57) ABSTRACT

According to an embodiment, an ordering device determines a processing order of pieces of data in each computer in a multiplex system. The device includes a preliminary elector and a confidence elector. The preliminary elector is configured to generate, when a vote having the current order number, the current round number, and a nominated state is acquired from a primary computer, a vote that includes data included in the acquired vote, the current order number, a round number following the current round number, and a winning-assured state. The confidence elector is configured to determine, when a vote having the current order number, the current round number, and the winning-assured state is acquired for identical data from each of a threshold or more of the computers, data included in the acquired vote to be data to be processed at the current order number.

23 Claims, 12 Drawing Sheets

(58) Field of Classification Search
CPC .... G06F 11/182; G06F 11/183; G06F 11/184; G06F 11/185; G06F 11/186; G06F 11/187
See application file for complete search history.

(56) References Cited

U.S. PATENT DOCUMENTS

| | | | | |
|---|---|---|---|---|
| 6,178,522 | B1* | 1/2001 | Zhou | G06F 11/181 714/11 |
| 6,799,222 | B1 | 9/2004 | Endo | |
| 7,272,632 | B2 | 9/2007 | Endo | |
| 7,739,677 | B1* | 6/2010 | Kekre | G06F 11/202 709/214 |
| 2001/0039630 | A1* | 11/2001 | Kursawe | G06F 11/182 714/4.1 |
| 2002/0085506 | A1* | 7/2002 | Hundscheidt | H04L 12/185 370/254 |
| 2002/0194276 | A1 | 12/2002 | Endo | |
| 2003/0065708 | A1* | 4/2003 | Jacobs | H04L 12/1868 709/201 |
| 2007/0214355 | A1* | 9/2007 | Lamport | G06F 11/182 713/156 |
| 2010/0017644 | A1* | 1/2010 | Butterworth | G06F 11/1658 714/4.1 |
| 2010/0169886 | A1* | 7/2010 | Troxel | G06F 11/184 718/101 |
| 2011/0302449 | A1* | 12/2011 | Douceur | G06F 11/187 714/15 |
| 2012/0254342 | A1* | 10/2012 | Evans | G06F 11/186 709/214 |
| 2015/0161016 | A1* | 6/2015 | Bulkowski | G06F 11/183 714/4.2 |
| 2016/0191676 | A1 | 6/2016 | Endo | |
| 2017/0004029 | A1* | 1/2017 | Endo | G06F 11/18 |

FOREIGN PATENT DOCUMENTS

| | | |
|---|---|---|
| JP | 2003-067215 | 3/2003 |
| JP | 2010-152559 | 7/2010 |
| JP | 2011-118747 | 6/2011 |

OTHER PUBLICATIONS

ZooKeeper Internals <URL:http://zookeeper.apache.org/doc/current/zookeeperInternals.html> Obtained Jul. 12, 2014.

* cited by examiner

US 10,162,719 B2

ORDERING DEVICE, DATA PROCESSING DEVICE, ORDERING METHOD, COMPUTER PROGRAM PRODUCT, AND MULTIPLEX SYSTEM

CROSS-REFERENCE TO RELATED APPLICATION

This application is a continuation of PCT international application Ser. No. PCT/JP2014/070625 filed on Aug. 5, 2014, the entire contents of which are incorporated herein by reference.

FIELD

Embodiments described herein relate generally to an ordering device, a data processing device, an ordering method, a computer program product, and a multiplex system.

BACKGROUND

In the conventional multiplex system in practical use, a plurality of computers redundantly execute identical processing. Such a multiplex system provides improved availability because, even if failure occurs at any one of the computers, the other computers continue processing.

One of known technologies used to implement the multiplex system is ordered multicasting. The ordered multicasting is processing of distributing input data as a processing target to a plurality of computers and determining a processing order of the input data. Execution of the ordered multicasting allows computer to process identical input data in an identical order. As a result, each computer can output an identical output data string.

In the ordered multicasting, input data is ordered while being reciprocated between computers. A processing time of communicating data between computers in the ordered multicasting is long as compared to other processing times. Thus, the number of times of data reciprocation between computers in the ordered multicasting is a bottleneck of speeding up in the multiplex system.

For this reason, the number of times of data reciprocation between computers is desirably reduced in the ordered multicasting. For example, reduction in the number of times of data reciprocation in the best case is important for execution of the ordered multicasting in a short time.

DETAILED DESCRIPTION

According to an embodiment, an ordering device determines a processing order of a plurality of pieces of data and is provided to a computer in a multiplex system that includes a plurality of computers each executing identical processing on the pieces of data in an identical order. The device includes a round manager, a first preliminary elector, and a confidence elector. The round manager is configured to manage a current order number and a current round number. The first preliminary elector is configured to generate, in a first case in which a vote an order number of which is identical to the current order number, a round number of which is identical to the current round number, and a selection state of which is a nominated state is acquired from a primary computer among the computers, a vote that includes data included in the vote acquired from the primary computer, the current order number, a round number following the current round number, and a winning-assured state. The first preliminary elector is also configured to output the generated vote to the computers, and increment the current round number to a next value. The confidence elector is configured to determine, in a second case in which a vote the order number of which is identical to the current order number, the round number of which is identical to the current round number, and the selection state of which is the winning-assured state is acquired for identical data from each of a first threshold or more of the computers, data included in the vote acquired from each of the first threshold or more of the computers to be data to be processed at the current order number.

A multiplex system according to embodiments will be described below in detail with reference to the accompanying drawings. The multiplex system according to the embodiments is configured to cause a plurality of computers (for example, server devices serving as data processing devices) to execute identical processing on input data in an identical order, and is intended to reduce the number of times of data reciprocation between the computers.

First Embodiment

Figure 1:
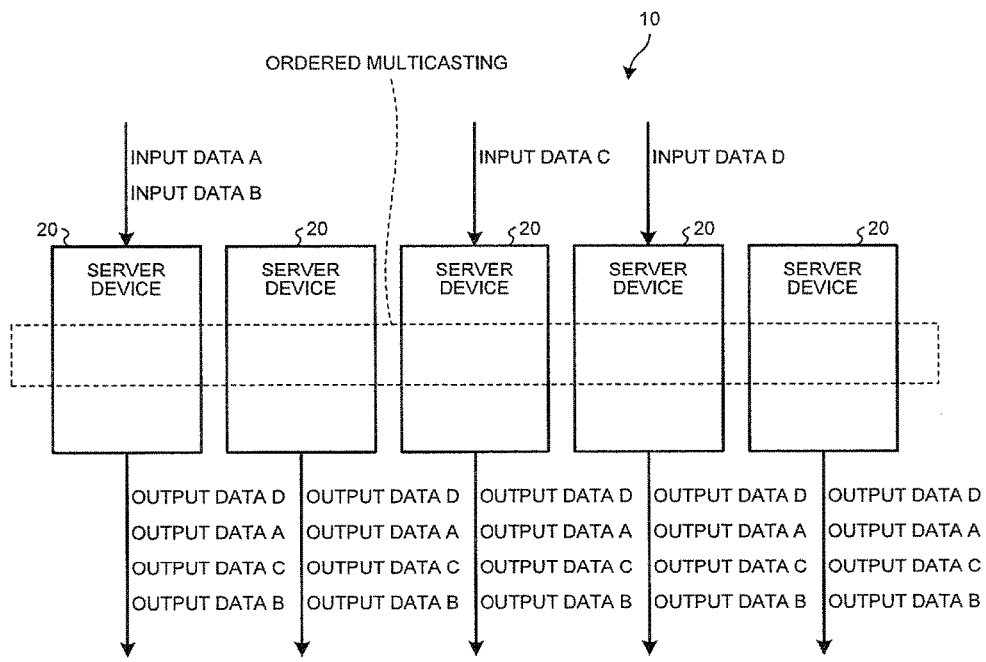
FIG. 1 is a diagram illustrating the configuration of a multiplex system 10 according to a first embodiment.

FIG. 1 is a diagram illustrating the configuration of a multiplex system 10 according to a first embodiment. The multiplex system 10 includes a plurality of server devices 20. The server devices 20 are each a computer connected to a network and capable of communicating data with each other.

The server device 20 receives data from an external device such as a client device. The data may be received by any of the server devices 20 included in the multiplex system 10.

The data received by any of the server devices 20 is transmitted to all server devices 20 through the network. Each server device 20 acquires all data received by the server devices 20 included in the multiplex system 10. Then, the server-device 20 executes identical processing on the received data in an identical order. Accordingly, each server device 20 can output an identical output data string.

In the present embodiment, ordered multicasting refers to processing involving distribution of processing target data to the server devices 20 and determination of a processing order of the data. The multiplex system 10 according to the present embodiment can reduce the number of times of data reciprocation between the server devices 20 in the ordered multicasting.

Figure 2:
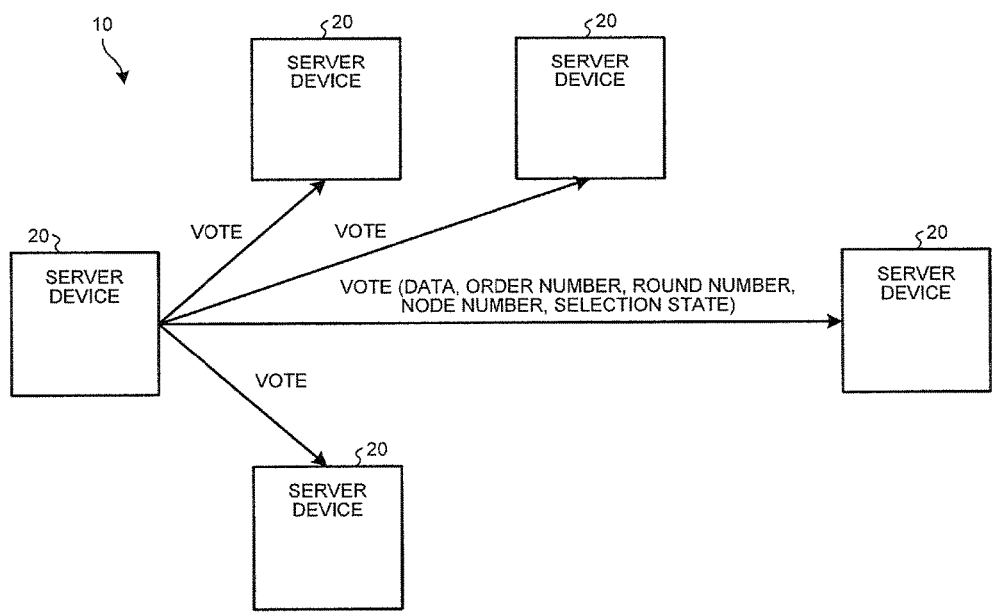
FIG. 2 is a diagram illustrating that votes are transmitted from one server device 20 to other server devices 20.

FIG. 2 is a diagram illustrating that votes are transmitted from one of the server devices 20 to the other server devices 20.

In the present embodiment, the multiplex system 10 includes n (n is an integer equal to or larger than two) of the server devices 20. The multiplex system 10 allows failure at f of the server devices 20. The value f is a positive integer smaller than n. The relation of n>2f holds.

Each server device 20 generates a vote, and outputs the generated vote to the server device 20 and the other server devices 20. The server device 20 executes the ordered multicasting by repeating the generation and outputting of a vote a plurality of times.

A vote is information including data, an order number, a round number, a node number, and a selection state. The data is data received by any of the server devices 20 from the outside and is a processing target in the multiplex system 10.

The order number is a value indicating a processing order of the data included in this vote. The order number is a sequentially increased value. In the present embodiment, the order number is an integer incremented by one.

The round number is a value indicating a processing stage of execution at the server device 20 for determining data to be processed at the order number included in this vote. The round number is a value sequentially increased from an initial value. In the present embodiment, the round number is an integer incremented by one. In the present embodiment, the round number has an initial value of one.

A round refers to a pair of the order number and the round number. A next round refers to a round having an order number identical to that of a certain round and a round number following the round number of the certain round. An initial round refers to a round having a round number equal to the initial value.

The node number is an integer value for identifying the server device 20 that has generated this vote. The vote may include, in place of the node number, any information, such as a symbol string, for identifying each server device 20.

The selection state is information indicating a state in which the data included in this vote is treated by the server device 20. A vote includes, as the selection state, any one of a substitution state, a nominated state, a winning-assured state, and a winning state.

The substitution state indicates that the data included in this vote is a candidate for a substitute of data processed at the order number included in this vote. The nominated state indicates that the data included in this vote is nominated as a candidate for data to be processed at the order number included in this vote. The winning-assured state indicates that the data included in this vote is virtually assured as data to be processed at the order number included in this vote. The winning state indicates that the data included in this vote is determined to be data to be processed at the order number included in this vote.

A substitution vote refers to a vote including the substitution state, a nomination vote refers to a vote including the nominated state, a winning-assuring vote refers to a vote including the winning-assured state, and a winning vote refers to a vote including the winning state.

The server device 20 executes processing called election to generate a vote for each order number at each round number. The server device 20 generates one vote for each round number.

The server device 20 executes, as the election, three pieces of processing of a first preliminary election, a second preliminary election, and a confidence election. The first preliminary election and the second preliminary election are collectively referred to as a preliminary election.

The preliminary election is processing of collecting the nomination votes generated by the server devices 20 at an identical round, and generating the winning-assuring vote or the substitution vote at the next round. The confidence election is processing of collecting the winning-assuring votes or the substitution votes generated by the server devices 20 at an identical round, and generating the nomination vote or the winning vote at the next round. The server devices 20 alternately repeat the preliminary election and the confidence election at each round.

In the present embodiment, the server devices 20 execute the preliminary election when the round number is an odd number, and execute the confidence election when the round number is an even number. Thus, in the present embodiment, the round number included in the winning-assuring vote or the substitution vote is an even number, and the round number included in the nomination vote is an odd number.

The server devices 20 generate one winning vote for each order number. Having generated the winning vote through the confidence election, the server devices 20 determine data processed at the order number, and thereafter do not execute the preliminary election or the confidence election for this order number. In the present embodiment, the winning vote does not include the round number.

Having received, for a certain order number, data from the external client device or a vote at the initial round from another server device 20, the server device 20 executes initial vote generation processing. In the initial vote generation processing, the server device 20 generates the nomination vote for the order number at the initial round. After having executed the initial vote generation processing, the server device 20 executes the first preliminary election at the initial round.

Having acquired the winning vote for a certain order number from another server device 20, the server device 20 executes winning processing. In the winning processing, the server device 20 determines data included in the acquired winning vote to be data processed at the order number. After having executed the winning processing, the server device 20 does not execute the preliminary election or the confidence election.

In the multiplex system 10, any one of the server devices 20 is specified as a primary device. The server device 20 as the primary device may be constantly the same or may be changed periodically. When periodically changed, the primary server device 20 is the same for each order number, and needs to be known by all server devices 20.

Figure 3:
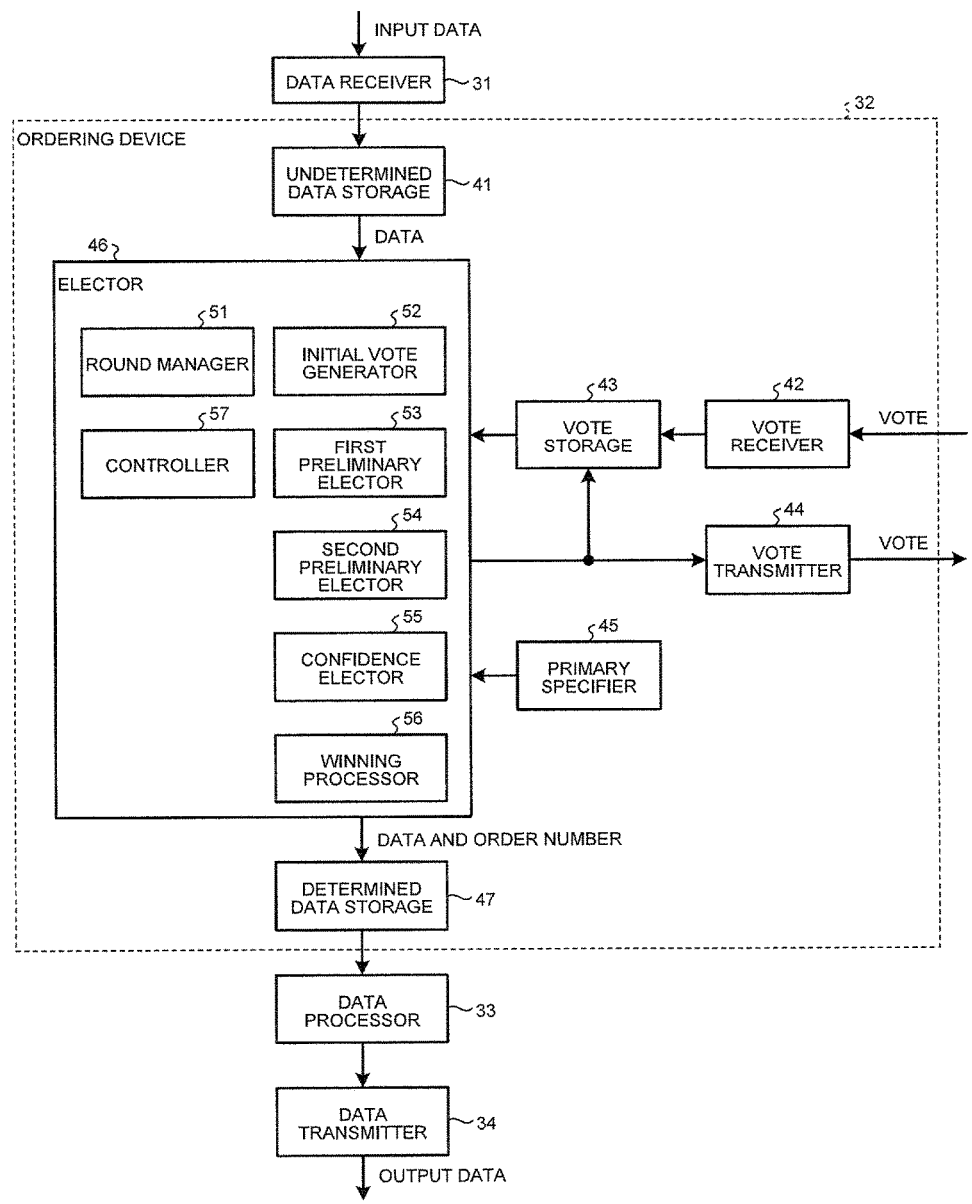
FIG. 3 is a diagram illustrating the configuration of each server device 20.

FIG. 3 is a diagram illustrating the configuration of each server device 20. The server device 20 includes a data receiver 31, an ordering device 32, a data processor 33, and a data transmitter 34. The data receiver 31 receives input data from the external client device through the network.

The ordering device 32 communicates votes with an ordering device 32 included in another server device 20 and executes the ordered multicasting processing on input data received by the data receiver 31. In other words, the ordering device 32 passes received input data to another server device 20 and acquires input data received by the other server device 20, and also determines a processing order of the input data to allow all server devices 20 to execute data processing in an identical order.

The data processor 33 processes the input data in the order determined by the ordering device 32. The data transmitter 34 transmits the data processed by the data processor 33, as output data to, for example, the external client device through the network.

The ordering device 32 includes an undetermined data storage 41, a vote receiver 42, a vote storage 43, a vote transmitter 44, a primary specifier 45, an elector 46, and a determined data storage 47.

The undetermined data storage 41 stores therein data the processing order of which is undetermined among data received by the data receiver 31.

The vote receiver 42 receives, through the network, a vote generated by another server device 20. The vote storage 43 stores therein the vote received by the vote receiver 42 and an own vote generated by the own server device 20. The own vote includes the node number of the own server device 20. The vote transmitter 44 transmits the own vote generated by the elector 46 to other server devices 20 through the network.

The primary specifier 45 specifies any one of the server devices 20 as the primary server device 20. In the present embodiment, the primary specifier 45 outputs the node number of the specified server device 20.

For example, the primary specifier 45 specifies a primary server device 20 for each current order number as a target of determination by the elector 46. The primary specifier 45 may specify, as the primary server device 20 for each order number, an identical server device 20 constantly or a different server device 20. By specifying a different server device 20 for each order number, the primary specifier 45 can avoid continuously specifying a failed server device 20 as a primary server device. For example, the primary specifier 45 specifies, as the primary server device 20, one server device 20 specified from the current order number by predetermined calculation among the server devices 20. More specifically, for example, the primary specifier 45 specifies, as the primary server device 20, the server device 20 having a node number specified by a remainder of division of the order number by the number of server devices 20.

The elector 46 determines a processing order of data stored in the undetermined data storage 41 and data included in a vote stored in the vote storage 43. In this case, the elector 46 determines an own vote by executing the initial vote generation processing, the first preliminary election, the second preliminary election, the confidence election, and the winning processing. The elector 46 outputs a pair of the data the processing order of which has been determined, and the order number indicating the processing order.

The determined data storage 47 stores therein the pair of the data and the order number output from the elector 46. When data is stored in the determined data storage 47, the corresponding data stored in the undetermined data storage 41 is deleted. Then, the determined data storage 47 outputs data stored therein to the data processor 33 in accordance with an order indicated by the order number in response to a reading request by the data processor 33 at a later stage.

The elector 46 includes a round manager 51, an initial vote generator 52, a first preliminary elector 53, a second preliminary elector 54, a confidence elector 55, a winning processor 56, and a controller 57.

The round manager 51 outputs the current order number as a target of determination by the elector 46. The round manager 51 outputs, as the current order number, a value incremented by one. The round manager 51 outputs the current round number, which is the current stage of processing by the elector 46. The round manager 51 outputs, as the current round number, a value incremented by one from an initial value of one.

The initial vote generator 52 executes initial vote processing. More specifically, when the current round number has the initial value (one, in the present embodiment), the initial vote generator 52 generates the nomination vote including first data, the current order number, the current round number, the nominated state, and the node number (own node number) of the own server device 20. Then, the initial vote generator 52 outputs the generated nomination vote to the server devices 20 (the own server device 20 and all other server devices 20).

The first data is data (data stored in the undetermined data storage 41) that is received from the outside and the order of which is not determined, or data included in a vote the order number of which is identical to the current order number and the round number of which has the initial value among votes stored in the vote storage 43. When both the data that is received from the outside and the order of which is not determined and the data included in the vote the order number of which is identical to the current order number and the round number of which has the initial value exist, the initial vote generator 52 may give priority to setting the first data to be the data the order of which is not determined.

The first preliminary elector 53 determines whether a vote (a nomination vote) the order number of which is identical to the current order number from the primary server device 20 among the server devices 20, the round number of which is identical to the current round number, and the selection state of which is the nominated state is acquired. If this is the case (a first case), the first preliminary elector 53 generates a vote (a winning-assuring vote) including data included in the nomination vote acquired from the primary server device 20, the current order number, the round number following the current round number, the winning-assured state, and the own node number. Then, the first preliminary elector 53 outputs the generated winning-assuring vote to the server devices 20 (the own server device 20 and all other server devices 20) and increments the current round number output from the round manager 51 to the next value.

The first preliminary elector 53 determines whether a vote the order number of which is identical to the current order number and the round number of which is identical to the current round number is acquired from each of n−f (a second threshold) or more of the server devices 20 not in the first case. The value n is the number of server devices 20, and the value f is the allowable number of server devices 20 in failure. If this is the case, the first preliminary elector 53 generates a vote (a substitution vote) including data included in any of the acquired votes, the current order number, the round number following the current round number, the substitution state, and the own node number. Then, the first preliminary elector 53 outputs the generated substitution vote to the server devices 20 (the own server device 20 and all other server devices 20), and increments the current round number output from the round manager 51 to the next value.

The second preliminary elector 54 determines whether no vote is generated by the first preliminary elector 53, and a vote (a nomination vote) the order number of which is identical to the current order number, the round number of which is identical to the current round number, and the selection state of which is the nominated state is acquired from each of a majority of the server devices 20 for identical data. If this is the case (a third case), the second preliminary elector 54 generates a vote (a winning-assuring vote) including data included in the nomination vote acquired from each of the majority of the server devices 20, the current order number, the round number following the current round number, the winning-assured state, and the own node number. Then, the second preliminary elector 54 outputs the generated winning-assuring vote to the server devices 20 (the own server device 20 and all other server devices 20), and increments the current round number output from the round manager 51 to the next value.

The second preliminary elector 54 determines whether a vote the order number of which is identical to the current order number, and the round number of which is identical to the current round number is acquired from n−f (the second threshold) or more of the server devices 20 not in the third case. If this is the case, the second preliminary elector 54 generates a vote (a substitution vote) including data included in any of the acquired votes, the current order number, the round number following the current round number, the substitution state, and the own node number. Then, the second preliminary elector 54 outputs the generated substitution vote to the server devices 20 (the own server device 20 and all other server devices 20), and increments the current round number output from the round manager 51 to the next value.

The confidence elector 55 determines whether a vote (a winning-assuring vote) the order number of which is identical to the current order number, the round number of which is identical to the current round number, and the selection state of which is the winning-assured state is acquired from f+1 (a first threshold) or more of the server devices 20 for identical data. If this is the case (a second case), the confidence elector 55 determines data included in the winning-assuring votes acquired from f+1 (the first threshold) or more of the server devices 20 to be data to be processed at the current order number. Then, the confidence elector 55 outputs a pair of the determined data and the current order number to the determined data storage 47.

The confidence elector 55 generates a vote (a winning vote) including the data included in the winning-assuring votes acquired from f+1 (the first threshold) or more of the server devices 20, the current order number, the winning state, and the own node number. Then, the confidence elector 55 outputs the generated winning vote to the other server devices 20, increments the current order number output from the round manager 51 to the next value, and sets the current round number back to the initial value.

The confidence elector 55 also determines whether a vote the order number of which is identical to the current order number, and the round number of which is identical to the current round number is acquired from each of n−f (the second threshold) or more of the server devices 20 not in the second case. If this is the case, the confidence elector 55 generates a vote (a nomination vote) including data included in any of the acquired votes, the current order number, the round number following the current round number, the nominated state, and the own node number. If the winning-assuring vote is included in the votes acquired from n−f (the second threshold) or more of the server devices 20, the confidence elector 55 may generate the nomination vote including data of the winning-assuring vote. Then, the confidence elector 55 outputs the generated nomination vote to the server devices 20 (the own server device 20 and all other server devices 20), and increments the current round number output from the round manager 51 to the next value.

If a winning vote the order number of which is identical to the current order number, and the selection state of which is the winning state is acquired from any of the server devices 20, the winning processor 56 determines data included in a winning vote the selection state of which is the winning state to be data to be processed at the current order number. Then, the winning processor 56 outputs a pair of the determined data and the current order number to the determined data storage 47. Moreover, the winning processor 56 increments the current order number output from the round manager 51 to the next value, and sets the current round number back to the initial value. When not generating the winning vote at the current order number, the winning processor 56 may generate a winning vote including data included in the winning vote acquired from another server device 20, the current order number, the winning state, and the own node number, and may output the generated winning vote to the other server devices 20.

At each current round number, the controller 57 causes any one of the first preliminary elector 53, the second preliminary elector 54, and the confidence elector 55 to execute processing. If the current round number has the initial value, the controller 57 causes the first preliminary elector 53 to execute processing. If the current round number has a value following a value at which the first preliminary elector 53 or the second preliminary elector 54 has executed processing, the controller 57 causes the confidence elector 55 to execute processing. If the current round number has a value following a value at which the confidence elector 55 has executed processing, and the first preliminary elector 53 does not execute processing, the controller 57 causes the second preliminary elector 54 to execute processing.

For example, in a case in which the round number is incremented by one from an initial value of one, the controller 57 causes the first preliminary elector 53 to execute processing if the round number is one, and causes the confidence elector 55 to execute processing if the round number is an even number. If the round number is an odd number other than one, the controller 57 causes the second preliminary elector 54 to execute processing.

If the current round number has the initial value, the controller 57 causes the initial vote generator 52 to execute processing prior to execution by the first preliminary elector 53. If a winning vote the order number of which is identical to the current order number, and the selection state of which is the winning state is acquired from any of the server devices 20, the controller 57 gives priority to causing the winning processor 56 to execute processing irrespective of the round number.

Figure 4:
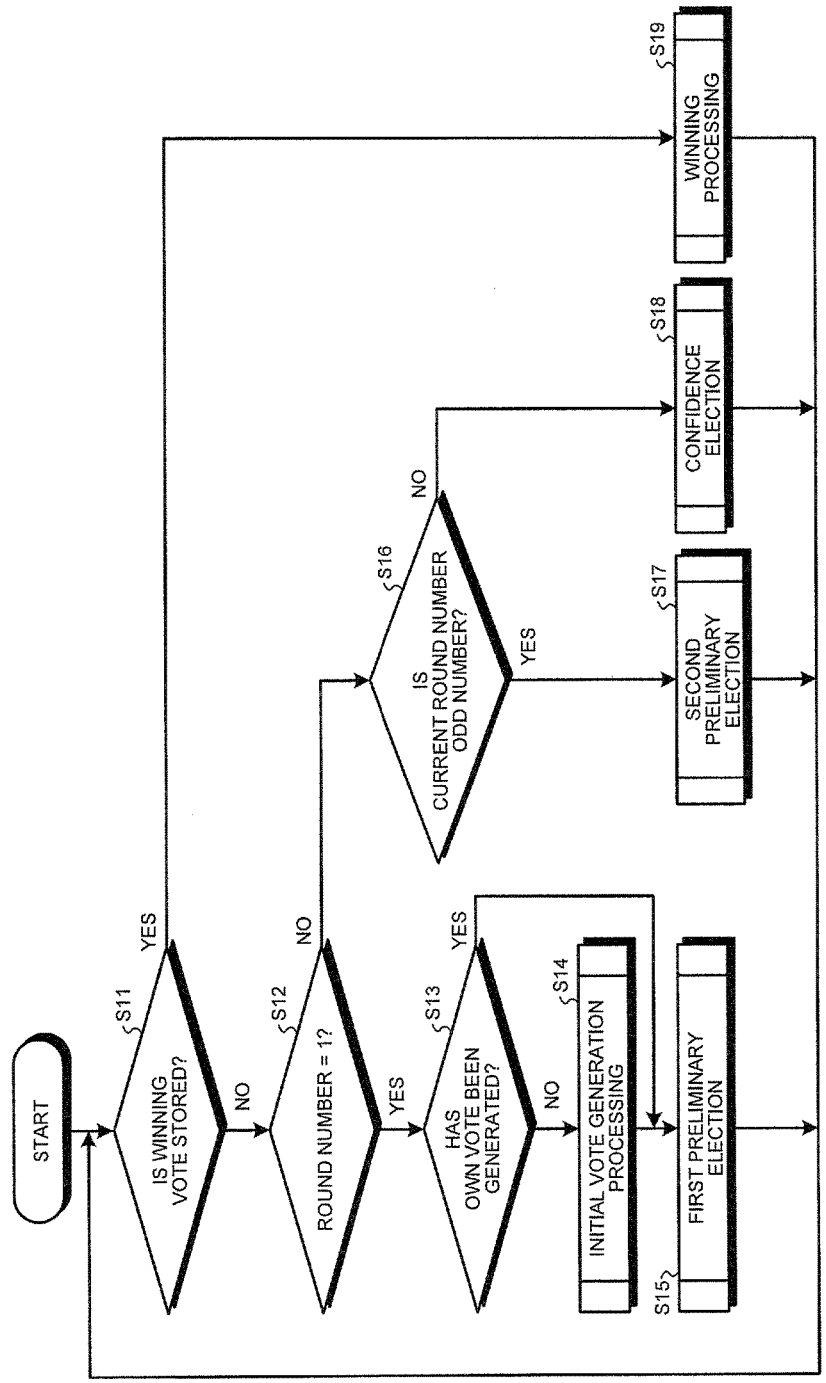
FIG. 4 is a flowchart of processing at an elector 46 of an ordering device 32.

FIG. 4 is a flowchart of processing at the elector 46 of the ordering device 32. If data stored in the undetermined data storage 41 has changed upon reception of data from the client device, or if data stored in the vote storage 43 has changed upon reception of a vote from another server device 20, the elector 46 of the ordering device 32 starts processing at step S11.

First at step S11, the controller 57 of the elector 46 determines whether a winning vote the order number of which is identical to the current order number is stored in the vote storage 43. The controller 57 advances the process to step S19 if the winning vote is stored (Yes at S11), or advances the process to step S12 if the winning vote is not stored (No at S11).

At step S12, the controller 57 determines whether the current round number is one (in other words, the initial value). The controller 57 advances the process to step S13 if the current round number is one (Yes at S12), or advances the process to step S16 if the current round number is not one (No at S12).

At step S13, the controller 57 determines whether an own vote having the current order number at the initial round (with a round number of one) is generated. If no own vote is generated (No at S13), the controller 57 advances the process to step S14, or advances the process to step S15 if the own vote is generated (Yes at S13).

At step S14, the controller 57 calls the initial vote generator 52 to execute the initial vote generation processing. Further description will be made on the initial vote generation processing later with reference to FIG. 5. If the initial vote generation processing ends and the process returns, the controller 57 advances the process to step S15.

At step S15, the controller 57 calls the first preliminary elector 53 to execute the first preliminary election. Further description will be made on the first preliminary election later with reference to FIG. 6. Then, if the first preliminary election ends and the process returns, the controller 57 returns the process back to step S11.

At step S16, the controller 57 determines whether the current round number is an odd number. The controller 57 advances the process to step S17 if the current round number is an odd number (Yes at S16), or advances the process to step S18 if the current round number is not an odd number (is an even number) (No at S16).

At step S17, the controller 57 calls the second preliminary elector 54 to execute the second preliminary election. Further description will be made on the second preliminary election later with reference to FIG. 7. Then, if the second preliminary election ends and the process returns, the controller 57 returns the process back to step S11.

At step S18, the controller 57 calls the confidence elector 55 to execute the confidence election. Further description will be made on the confidence election later with reference to FIG. 8. Then, if the confidence election ends and the process returns, the controller 57 returns the process back to step S11.

At step S19, the controller 57 calls the winning processor 56 to execute the winning processing. Further description will be made on the winning processing later with reference to FIG. 9. If the winning processing ends and the process returns, the controller 57 returns the process back to step S11.

Figure 5:
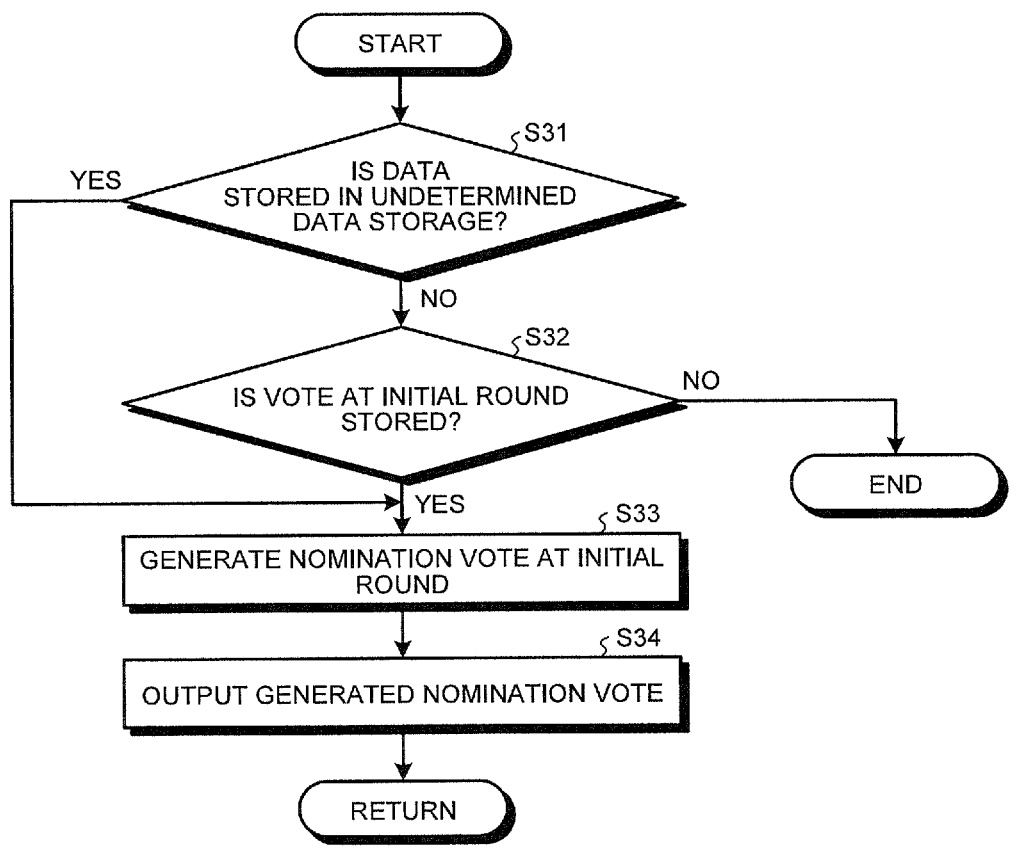
FIG. 5 is a flowchart of processing of initial vote generation.

FIG. 5 is a flowchart of the initial vote generation processing. When called by the controller 57 at step S14, the initial vote generator 52 executes the initial vote generation processing staring at step S31 illustrated in FIG. 5.

First at step S31, the initial vote generator 52 determines whether data is stored in the undetermined data storage 41. The initial vote generator 52 advances the process to step S33 if data is stored (Yes at S31), or advances the process to step S32 if no data is stored (No at S31).

At step S32, the initial vote generator 52 determines whether a vote the order number of which is identical to the current order number and the round number of which has the initial value is stored in the vote storage 43. The initial vote generator 52 advances the process to step S33 if the vote is stored (Yes at S32). If the vote is not stored (No at S32), the initial vote generator 52 returns the process back to the controller 57, and the controller 57 ends the entire process illustrated in FIG. 4.

At step S33, the initial vote generator 52 generates a nomination vote including the first data, the current order number, the current round number, the nominated state, and the node number of the own server device 20 (the own node number). The first data is data stored in the undetermined data storage 41, or data included in a vote the order number of which is identical to the current order number and the round number of which has the initial value.

Subsequently at step S34, the initial vote generator 52 outputs the generated nomination vote to the server devices 20 (the own server device 20 and all other server devices 20) at step S33. Having ended step S34, the initial vote generator 52 ends the initial vote generation processing, and returns the process back to the controller 57.

Figure 6:
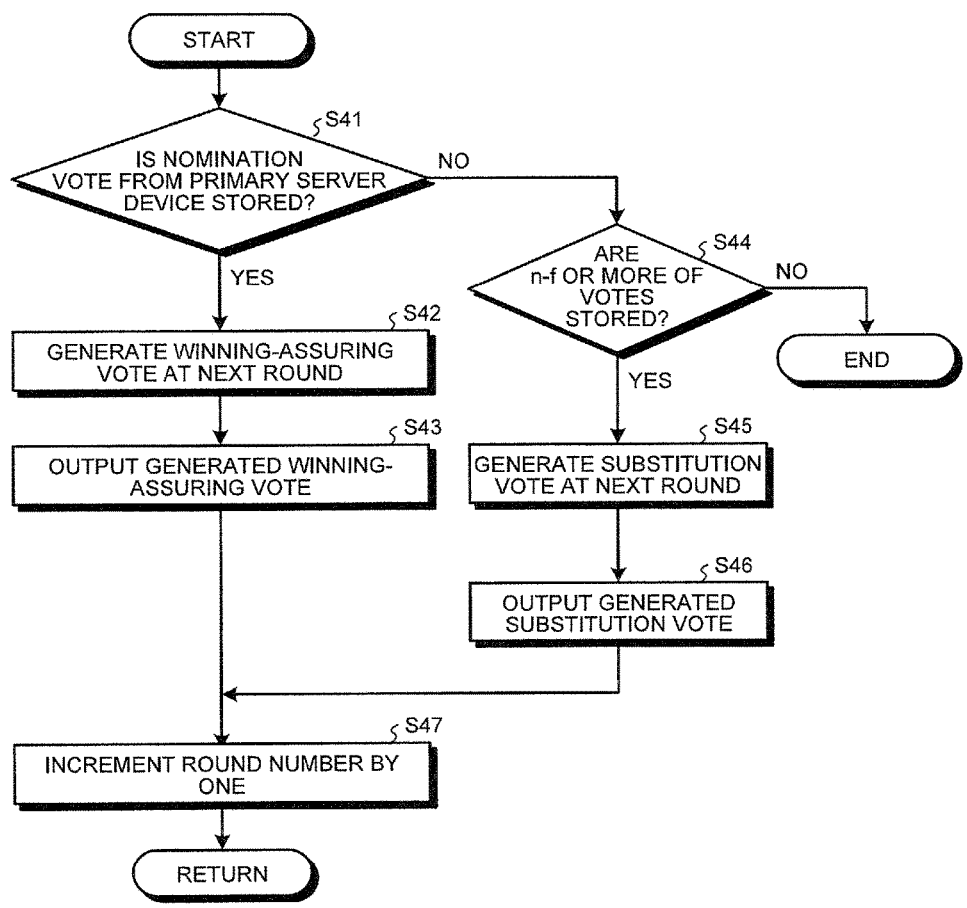
FIG. 6 is a flowchart of processing of first preliminary election.

FIG. 6 is a flowchart of processing of the first preliminary election. When called by the controller 57 at step S15, the first preliminary elector 53 executes the first preliminary election starting at step S41 illustrated in FIG. 6.

First at step S41, the first preliminary elector 53 determines whether a vote (a nomination vote) the node number of which is the node number of the primary server device 20, the order number of which is identical to the current order number, the round number of which is identical to the current round number, and the selection state of which is the nominated state is stored in the vote storage 43. The first preliminary elector 53 advances the process to step S42 if the nomination vote is stored (Yes at S41), or advances the process to step S44 if the nomination vote is not stored (No at S41).

At step S42, the first preliminary elector 53 generates a winning-assuring vote including data included in the nomination vote acquired from the primary server device 20, the current order number, the round number following the current round number, the winning-assured state, and the own node number. Subsequently at step S43, the first preliminary elector 53 outputs the generated winning-assuring vote to the server devices 20 (the own server device 20 and all other server devices 20). Having ended step S43, the first preliminary elector 53 advances the process to step S47.

At step S44, the first preliminary elector 53 determines whether n−f (the second threshold) or more of votes the order number of each of which is identical to the current order number, and the round number of each of which is identical to the current round number are stored in the vote storage 43. The first preliminary elector 53 advances the process to step S45 if n−f or more of votes are stored (Yes at S44). If n−f or more of votes are not stored (No at S44), the first preliminary elector 53 returns the process back to the controller 57, and the controller 57 ends the entire process illustrated in FIG. 4.

At step S45, the first preliminary elector 53 generates a vote (a substitution vote) including data included in any of the n−f or more of votes, the current order number, the round number following the current round number, the substitution state, and the own node number. Subsequently at step S46, the first preliminary elector 53 outputs the generated substitution vote to the server devices 20 (the own server device 20 and all other server devices 20). Having ended step S46, the first preliminary elector 53 advances the process to step S47.

At step S47, the first preliminary elector 53 obtains the next value by incrementing the current round number output from the round manager 51 by one. Having ended step S47, the first preliminary elector 53 ends the first preliminary election, and returns the process back to the controller 57.

Figure 7:
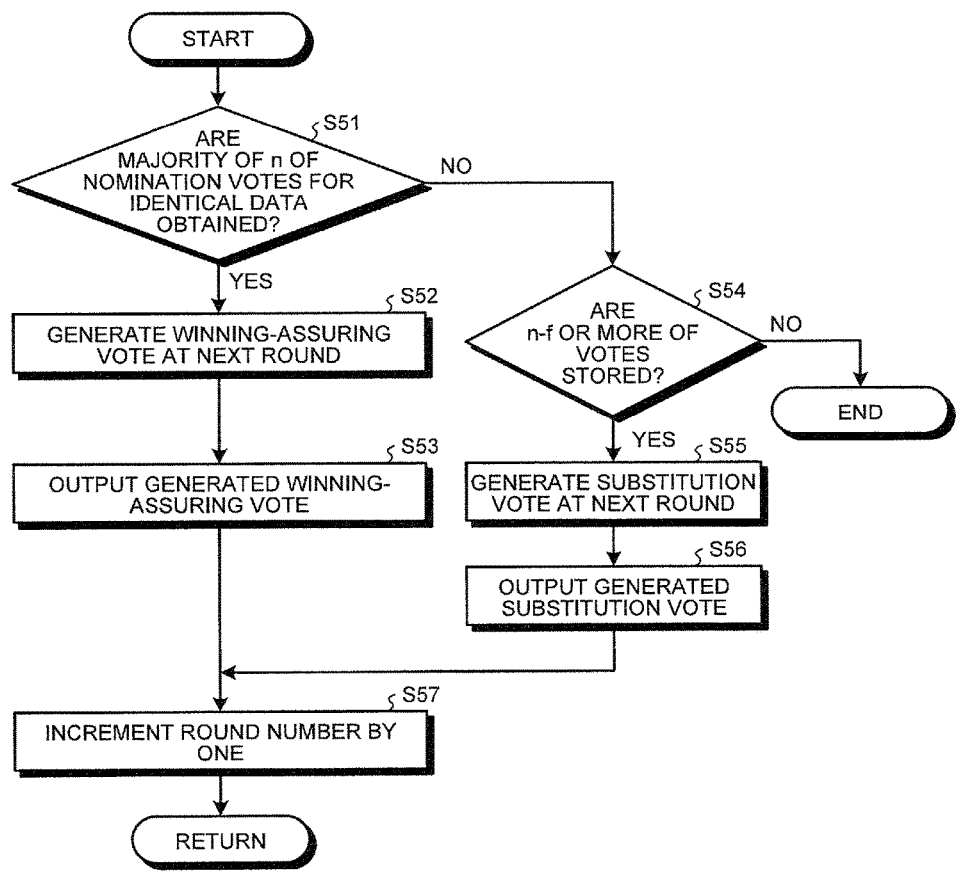
FIG. 7 is a flowchart of processing of second preliminary election.

FIG. 7 is a flowchart of processing of the second preliminary election. When called by the controller 57 at step S17, the second preliminary elector 54 executes the second preliminary election starting at step S51 illustrated in FIG. 7.

First at step S51, the second preliminary elector 54 determines whether the majority of n of the nomination votes for identical data, the order number of which is identical to the current order number, the round number of which is identical to the current round number, and the selection state of which is the nominated state are stored in the vote storage 43. The second preliminary elector 54 advances the process to step S52 if the number of the nomination votes is a majority of n (Yes at S51), or advances the process to step S54 if the number of the nomination votes is not a majority of n (No at S51).

At step S52, the second preliminary elector 54 generates a vote (a winning-assuring vote) including data included in the nomination votes obtained for the majority of n, the current order number, the round number following the current round number, the winning-assured state, and the own node number. Subsequently at step S53, the second preliminary elector 54 outputs the generated winning-assuring vote to the server devices 20 (the own server device 20 and all other server devices 20). Having ended step S53, the second preliminary elector 54 advances the process to step S57.

At step S54, the second preliminary elector 54 determines whether n−f (the second threshold) or more of votes the order number of each of which is identical to the current order number, and the round number of each of which is identical to the current round number are stored in the vote storage 43. The second preliminary elector 54 advances the process to step S55 if n−f or more of votes are stored (Yes at S54). If n−f or more of votes are not stored (No at S54), the second preliminary elector 54 returns the process back to the controller 57, and the controller 57 ends the entire process illustrated in FIG. 4.

At step S55, the second preliminary elector 54 generates a substitution vote including data included in any of the n−f or more of votes, the current order number, the round number following the current round number, the substitution state, and the own node number. Subsequently at step S56, the second preliminary elector 54 outputs the generated substitution vote to the server devices 20 (the own server device 20 and all other server devices 20). Having ended step S56, the second preliminary elector 54 advances the process to step S57.

At step S57, the second preliminary elector 54 obtains the next value by incrementing the current round number output from the round manager 51 by one. Having ended step S57, the second preliminary elector 54 ends the second preliminary election, and returns the process back to the controller 57.

Figure 8:
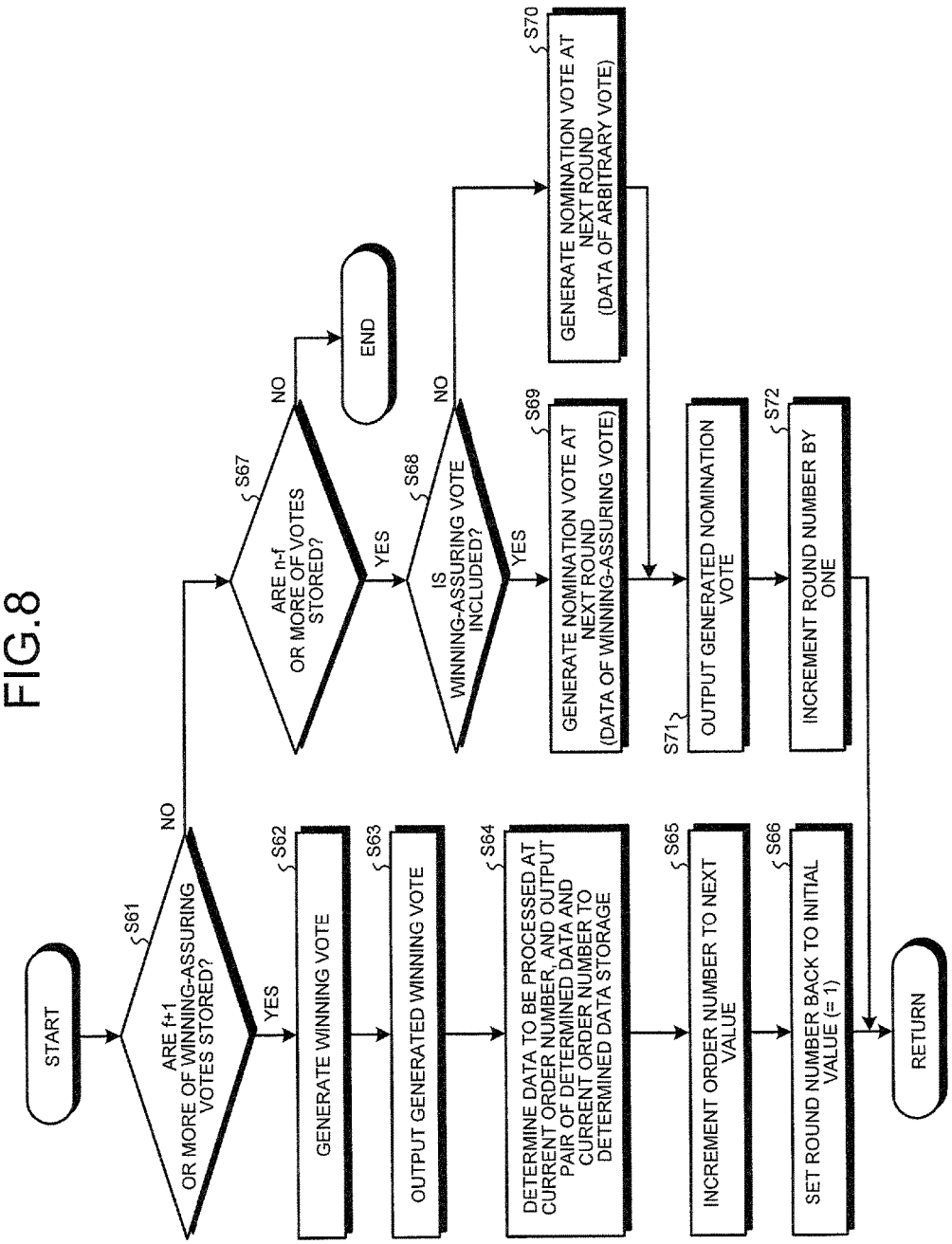
FIG. 8 is a flowchart of processing of confidence election.

FIG. 8 is a flowchart of processing of the confidence election. When called by the controller 57 at step S18, the confidence elector 55 executes the confidence election starting at step S61 illustrated in FIG. 8.

First at step S61, the confidence elector 55 determines whether f+1 (the first threshold) or more of the winning-assuring votes for identical data, the order number of each of which is identical to the current order number, the round number of each of which is identical to the current round number, and the selection state of each of which is the winning-assured state are stored. The confidence elector 55 advances the process to step S62 if the f+1 or more of the winning-assuring votes are stored (Yes at S61), or advances the process to step S67 if the f+1 or more of the winning-assuring votes are not stored (No at S61).

Subsequently at step S62, the confidence elector 55 generates a winning vote including data included in the f+1 or more of the winning-assuring votes, the current order number, the winning state, and the own node number. At step S63, the confidence elector 55 outputs the generated winning vote to the other server devices 20.

At step S64, the confidence elector 55 determines the data included in the f+1 or more of the winning-assuring votes to be data to be processed at the current order number. Then, the confidence elector 55 outputs a pair of the determined data and the current order number to the determined data storage 47.

At step S65, the confidence elector 55 increments the current order number output from the round manager 51 to the next value. At step S66, the confidence elector 55 sets the current round number back to the initial value of one. Having ended step S66, the confidence elector 55 ends the confidence election, and returns the process back to the controller 57.

At step S67, the confidence elector 55 determines whether n−f (the second threshold) or more of votes the order number of each of which is identical to the current order number, and the round number of each of which is identical to the current round number are stored in the vote storage 43. The confidence elector 55 advances the process to step S68 if n−f or more of votes are stored (Yes at S67). If n−f or more of votes are not stored (No at S67), the confidence elector 55 returns the process back to the controller 57, and the controller 57 ends the entire process illustrated in FIG. 4.

At step S68, the confidence elector 55 determines whether a winning-assuring vote is included in the n−f or more of votes. The confidence elector 55 advances the process to step S69 if a winning-assuring vote is included (Yes at S68), or advances the process to step S70 if no winning-assuring vote is included (No at S68).

At step S69, the confidence elector 55 generates a nomination vote including data included in the winning-assuring vote, the current order number, the round number following the current round number, the nominated state, and the own node number. At step S70, the confidence elector 55 generates a nomination vote including data included in any of the n−f or more of votes, the current order number, the round number following the current round number, the nominated state, and the own node number. Having ended the processing at step S69 or step S70, the confidence elector 55 advances the process to step S71.

At step S71, the confidence elector 55 outputs the nomination vote generated at step S69 or S70 to the server devices 20 (the own server device 20 and all other server devices 20). Subsequently at step S72, the confidence elector 55 obtains the next value by incrementing the current round number output from the round manager 51 by one. Having ended step S72, the confidence elector 55 ends the confidence election, and returns the process back to the controller 57.

Figure 9:
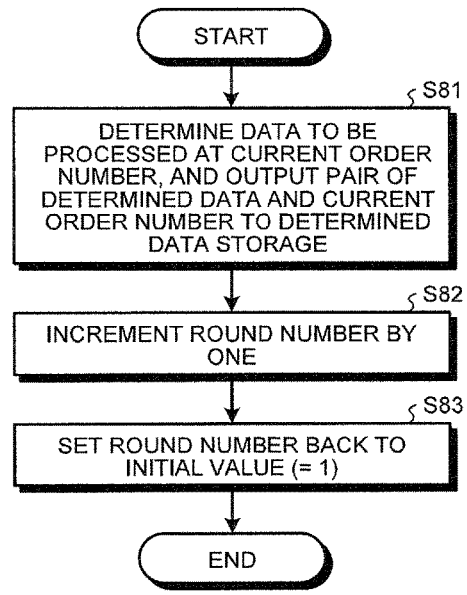
FIG. 9 is a flowchart of winning processing.

FIG. 9 is a flowchart of the winning processing. When called by the controller 57 at step S19, the winning processor 56 executes the winning processing starting at step S81 illustrated in FIG. 9.

First at step S81, the winning processor 56 determines data included in an acquired winning-assuring vote to be data to be processed at the current order number. Then, the winning processor 56 outputs a pair of the determined data and the current order number to the determined data storage 47.

Subsequently at step S82, the winning processor 56 increments the current order number output from the round manager 51 to the next value. At step S83, the winning processor 56 sets the current round number back to the initial value of one. Having ended step S83, the winning processor 56 ends the winning processing, and returns the process back to the controller 57.

Effect of Multiplex System 10

In the multiplex system 10 according to the present embodiment as described above, the server devices 20 can execute identical processing on input data in an identical order. Moreover, in the multiplex system 10 according to the present embodiment, data can be reciprocated between the server devices 20 in a reduced number of times. For example, in the multiplex system 10, data communication between the server devices 20 for determination of data executed at a certain order number can be completed in one reciprocation in the best case.

Figure 10:
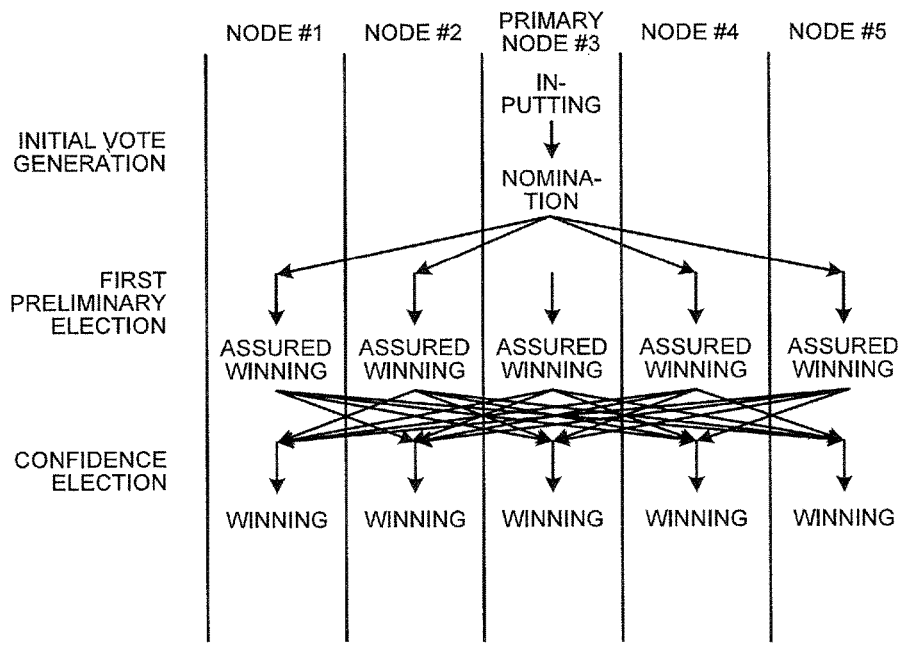
FIG. 10 is a diagram illustrating the shortest paths among paths along which winning is determined.

FIG. 10 is a diagram illustrating the shortest paths among paths along which winning is determined. FIG. 10 illustrates the shortest paths from inputting of data to generation of a winning vote in the multiplex system 10.

Specifically, in the first process, the primary server device 20 receives input data and generates a nomination vote at the initial round (an initial vote generation). Subsequently, in the second process, the primary server device 20 transmits the nomination vote at the initial round to all server devices 20. In the third process, each server device 20 receives the nomination vote at the initial round from the primary server device 20, and generates a winning-assuring vote at the second round (the first preliminary election). In the fourth process, each server device 20 transmits the winning-assuring vote at the second round to all server devices 20. Then, in the fifth process, each server device 20 receives f+1 or more of the winning-assuring votes at the second round, and generates a winning vote (the confidence election).

Along this path, in the multiplex system 10, votes are transmitted in the second process and the fourth process. In other words, in the multiplex system 10, processing is completed in one reciprocation of the vote transmission along the shortest path (best case).

The following describes processing until generation of a winning vote in a case that the first preliminary election is not executed. In this case, the shortest path from inputting of data to the generation of a winning vote is as follows.

First, in the first process, the primary server device 20 receives input data and generates a nomination vote at the initial round (the initial vote generation). Subsequently, in the second process, the primary server device 20 transmits the nomination vote at the initial round to all server devices 20. In the third process, each server device 20 receives the nomination vote from the primary server device 20, and generates a nomination vote at the initial round (the initial vote generation). In the fourth process, each server device 20 transmits the nomination vote at the initial round to all server devices 20.

In the fifth process, each server device 20 receives a majority of the nomination votes at the initial round, and generates a winning-assuring vote at the second round (the second preliminary election). In the sixth process, each server device 20 transmits the winning-assuring vote at the second round to all server devices 20. Then, in the seventh process, each server device 20 receives f+1 or more of the winning-assuring votes at the second round, and generates a winning vote (the confidence election).

If the first preliminary election is not executed, the multiplex system 10 transmits votes in the second process, the fourth process, and the sixth process. In other words, the multiplex system 10 needs to transmit votes in 1.5 reciprocations if the first preliminary election is not executed.

In this manner, in the multiplex system 10 according to the present embodiment, each server device 20 can, by executing the first preliminary election to receive a nomination vote from the primary server device 20, generate a winning-assuring vote including data included in the nomination vote. Accordingly, the multiplex system 10 according to the present embodiment can transmit votes in one reciprocation along the shortest path along which a winning vote is generated, thereby reducing influence of a bottleneck in ordered multicarrier.

Figure 11:
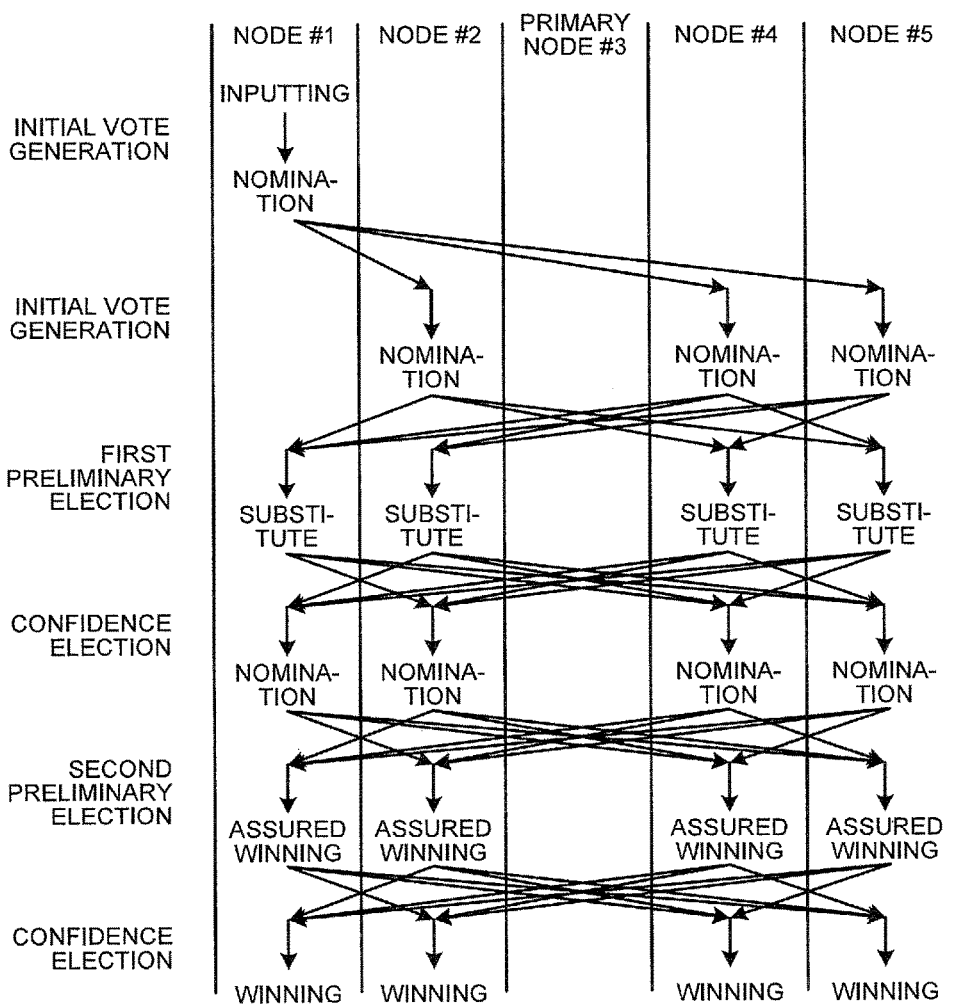
FIG. 11 is a diagram illustrating paths along which winning is determined at failure of a primary server device 20.

FIG. 11 is a diagram illustrating paths along which winning is determined at failure of the primary server device 20.

The multiplex system 10 allows failure at f (f is an integer satisfying $2f<n$) of server devices 20 at maximum. The multiplex system 10 has a non-blocking property that processing is not interrupted by generation of failure at any of the server devices 20.

Moreover, the primary server device 20 in the multiplex system 10 does not need to have a unique function, such as protocol arbitration, that is different from functions of other server devices. Thus, the multiplex system 10 maintains the non-blocking property even if failure occurs at the primary server device 20. Specifically, when the primary server device 20 has stopped, the multiplex system 10 can continue operation as long as n−f of server devices 20 are in operation.

FIG. 11 illustrates the shortest paths from inputting of data to generation of a winning vote when the primary server device 20 has stopped operation in the multiplex system 10.

Specifically, first, in the first process, a first server device 20 that is not a primary device receives input data and generates a nomination vote at the initial round (the initial vote generation). Subsequently, in the second process, the first server device 20 transmits the nomination vote at the initial round to all server devices 20 except for the failed primary server device 20. In the third process, each server device 20 receives the nomination vote from the first server device 20, and generates a nomination vote at the initial round (the initial vote generation). In the fourth process, each server device 20 transmits the nomination vote at the initial round to all server devices 20 except for the failed primary server device 20.

In the fifth process, each server device 20 receives n−f or more of votes at the initial round, and generates a substitution vote at the second round (the first preliminary election). In the sixth process, each server device 20 transmits the substitution vote at the second round to all server devices 20 except for the failed primary server device 20.

In the seventh process, each server device 20 receives n−f or more of votes at the second round, and generates a nomination vote at the third round (the confidence election). In the eighth process, each server device 20 transmits the nomination vote at the third round to all server devices 20 except for the failed primary server device 20.

In the ninth process, each server device 20 receives a majority of the nomination votes at the third round, and generates a winning-assuring vote at the fourth round (the second preliminary election). In the tenth process, each server device 20 transmits the winning-assuring vote at the fourth round to all server devices 20 except for the failed primary server device 20.

Then, in the eleventh process, each server device 20 receives f+1 or more of the winning-assuring votes at the fourth round, and generates a winning vote (the confidence election).

At failure of the primary server device 20, the multiplex system 10 transmits votes in the second process, the fourth process, the sixth process, the eighth process, and the tenth process. In other words, at failure of the primary server device 20, the multiplex system 10 transmits votes in 2.5 reciprocations. However, the multiplex system 10 can execute the ordered multicasting even at failure of the primary server device 20.

As described above, the operation of the multiplex system 10 is not interrupted even when the primary server device 20 is not in operation. Thus, at failure of the primary server device 20, the multiplex system 10 does not need to switch the function of a primary device to another server device 20.

Proof of Validity of Algorithm

The following proof will be made on the validity of maintaining the consistency of the ordered multicasting in the multiplex system 10. In this proof, input data included in a vote is also referred to as the value of the vote. The symbol "#" indicates the number of elements of a set. The symbol "∩" indicates a common part of sets.

Lemma 1: The values of all winning-assuring votes at an identical round are equal to each other.
[Proof]

It is required to prove that values of the winning-assuring votes at round r are equal to each other. The winning-assuring votes are determined at the first preliminary election or the second preliminary election. The following proof is made for each of the cases.

When the winning-assuring votes at round r are determined by the first preliminary election, the values of the winning-assuring votes at round r are equal to the values of the nomination votes by the primary server device 20 at round r−1 according to the definition of the first preliminary election. Only one primary server device 20 exists, and thus the value of the nomination vote at round r−1 is unique. Therefore, the values of the winning-assuring votes at round r are equal to each other.

When the winning-assuring votes at round r are determined by the second preliminary election, the values of the winning-assuring votes at round r are determined to be the identical values of a majority of n of the obtained nomination votes according to the definition of the second preliminary election. Since n of nomination votes exist at maximum at round r−1, if a majority of n of the nomination votes have identical values, those values are unique. Therefore, the values of the winning-assuring votes at round r are equal to each other.

Lemma 2: The values of all winning votes determined by the confidence election at an identical round are equal to each other.
[Proof]

When the winning votes are determined by the confidence election, those winning votes are determined to be the identical values of f+1 or more of obtained winning-assuring votes. Thus, the values of the winning votes are equal to the values of the winning-assuring votes used in the confidence election. According to Lemma 1, the values of all winning-assuring votes at an identical round are equal to each other, and thus the values of all winning votes determined by the confidence election at the round are equal to each other.
[QED]

Lemma 3: When a winning vote x is determined by the confidence election, the values of the nomination votes determined by the confidence election at the same round are equal to the value of x.
[Proof]

When y represents a nomination vote determined by the confidence election at the same round, it needs to be proved that the values of x and y are equal to each other.

Ex represents a set of the winning-assuring votes having values equal to the value of x among votes used in the confidence election at which x is determined. Ey represents a set of votes used in the confidence election at which y is determined. Rounds of votes included in Ex and Ey are equal to each other. From the definition of an algorithm, the following is obtained.

$$\#(Ex) \geq f+1$$

$$\#(Ey) \geq n-f$$

Thus, $$\#(Ex \cap Ey) \geq \#(Ex) + \#(Ey) - n \geq 1$$

In other words, Ex and Ey includes a common vote. Thus, Ey includes the winning-assuring vote. Then, from the definition of the confidence election, y is not a randomly selected value but needs to be the nomination vote having a value equal to the value of x.

Lemma 4: When a winning vote x is determined by the confidence election, a vote determined by the confidence election at a round following the next round is the winning vote and has a value equal to the value of x.
[Proof]

First, the preliminary election following the confidence election at which x is determined will be described. This round is not the initial round, and thus this preliminary election is the second preliminary election. When n−f of nomination votes are obtained at the second preliminary election, the values of all of the nomination votes are equal to the value of x according to Lemma 3, and n−f is a majority of n, and thus the number of already obtained nomination votes having values equal to the value of x is a majority of n. Thus, from the definition of the second preliminary election, all results of the preliminary election are the winning-assuring votes having values equal to the value of x.

Then, when n−f of votes are obtained at the following confidence election, all of the votes are the winning-assuring votes having values equal to the value of x. Since n−f≥f+1, f+1 or more of the winning-assuring votes having values equal to the value of x are obtained. Thus, from the definition of the confidence election, all results of the confidence election are the winning votes having values equal to the value of x.
[QED]

According to Lemma 2 and Lemma 4, the winning votes have identical values even at different rounds. In other words, when r represents a round at which the winning votes are obtained for the first time, all votes by round r+2 are the winning votes having the same values.

The above proves that the consistency of multiplexing is guaranteed in the multiplex system 10 according to the present embodiment.

Lastly, description will be made for a real-time property, in which interruption of processing due to time-out is not generated when failure occurs, of the multiplex system 10 according to the present embodiment.

In the multiplex system 10 according to the present embodiment, the round proceeds as long as n−f of votes are obtained until the winning votes are obtained. In this process, which server device 20 is at what kind of failure is not concerned at all. Thus, at least n−f of votes can be obtained irrespective of generation of failure at any timing as long as the number of server devices 20 at which failure occurs is equal to or smaller than f, and thus the round proceeds.

Second Embodiment

Figure 12:
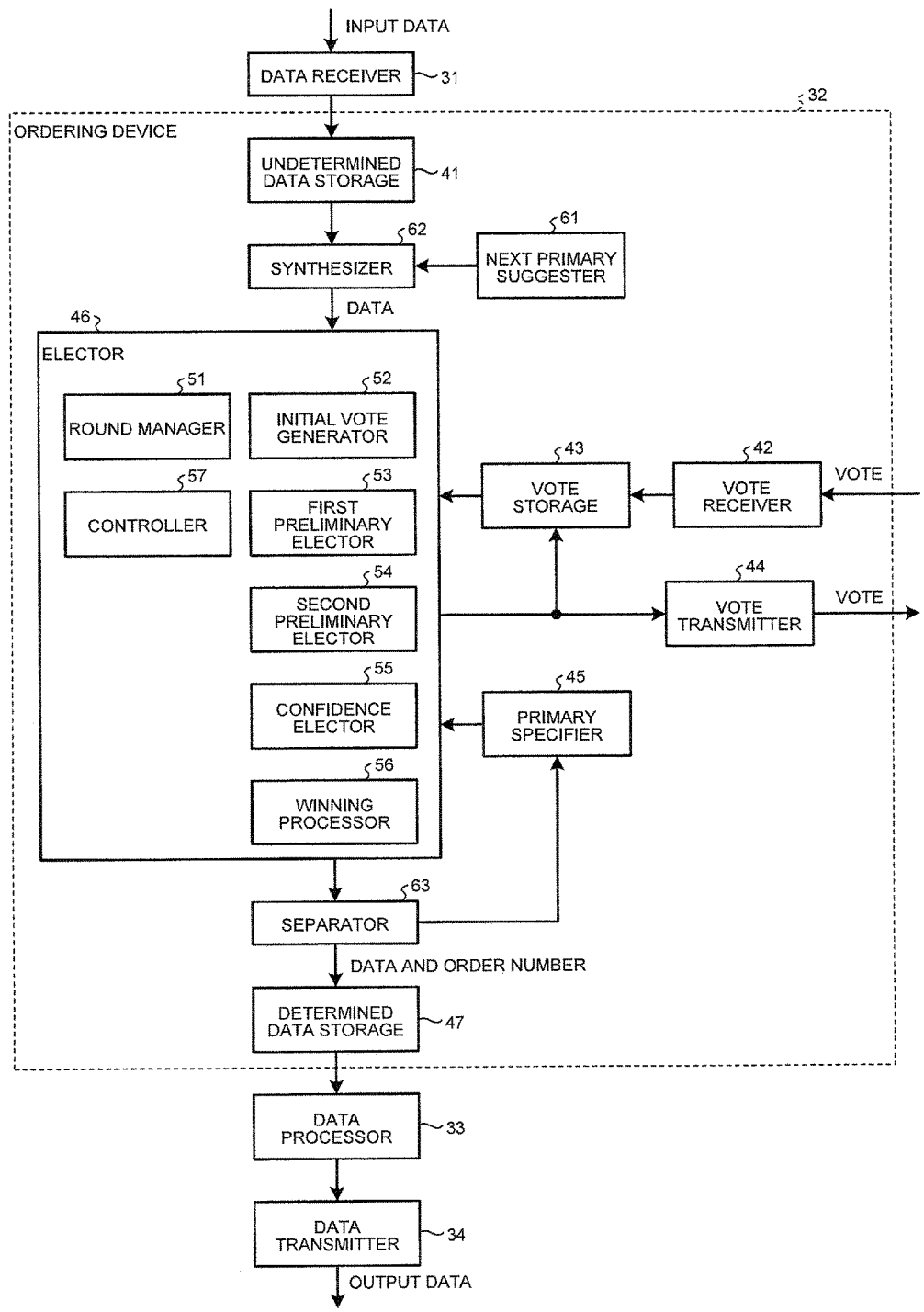
FIG. 12 is a diagram illustrating the configuration of the multiplex system 10 according to a second embodiment.

FIG. 12 is a diagram illustrating the configuration of the multiplex system 10 according to a second embodiment. The multiplex system 10 according to the second embodiment has a function and a configuration substantially identical to those of the first embodiment described with reference to FIGS. 1 to 11, and thus any member having a substantially identical function is denoted by an identical reference numeral, and description thereof will be omitted.

The ordering device 32 according to the second embodiment further includes a next primary suggester 61, a synthesizer 62, and a separator 63.

The next primary suggester 61 generates an identification value of the primary server device 20 for the order number following the current order number. The identification value may be, for example, the node number of the server device 20. The next primary suggester 61 can suggest any server device 20 as the primary server device 20 for the following order number. The next primary suggester 61 may suggest an identical or different server device 20 for each order number. The identification value of the suggested server device 20 may be different for each server device 20.

The synthesizer 62 synthesizes input data stored in the undetermined data storage 41 with the identification value output from the next primary suggester 61, and outputs the synthesized data as processing target data to the elector 46. In this case, the synthesizer 62 synthesizes the input data and the identification value in a separable manner.

For example, the synthesizer 62 may synthesize the input data and the identification value into one set of data such as an array. Alternatively, for example, the synthesizer 62 may synthesize the input data and the identification value into one piece of data by placing a bit string of the input data followed by a bit string of the identification value or vice versa.

Then, the elector 46 treats, as processing target data, data obtained by synthesizing the input data and the identification value. Thus, the elector 46 generates a vote including the data obtained by synthesizing the input data and the identification value. The elector 46 determines whether the data obtained by synthesizing the input data and the identification value is identical at determination of a nomination vote for identical data at the second preliminary election.

The separator 63 separates data the processing order of which is determined by the elector 46 into the input data and the identification value. Then, the separator 63 outputs the identification value after the separation to the primary specifier 45, and outputs part of the input data after the separation together with the order number to the determined data storage 47.

The primary specifier 45 specifies the server device 20 identified by the identification value separated by the separator 63, as the primary server device 20 for the order number following the order number of data the processing order of which is determined. Then, the primary specifier 45 outputs the node number of the specified primary server device 20 to the elector 46.

Data determined to be processed at a certain order number by the elector 46 is identical among all server devices 20. Thus, the identification value of the primary server device 20 for the following order number, separated from the data determined to be processed at a certain order number by the elector 46 is identical among all server devices 20. Accordingly, the ordering device 32 according to the second embodiment can consistently specify, for each order number, the primary server device 20 that is identical among all server devices 20.

The ordering device 32 according to the second embodiment may dynamically change the primary server device 20 for each order number. Accordingly, the ordering device 32 can avoid continuously specifying a failed server device 20 as the primary server device 20.

For example, the next primary suggester 61 may generate a value for identifying the own server device 20, as the identification value of the primary server device 20 for the following order number. Accordingly, the next primary suggester 61 can specify a server device 20 in operation (in other words, a server device 20 that is not failed) as a primary server device because at least the own server device 20 is in operation.

For example, the next primary suggester 61 may generate a value for identifying a server device 20 confirmed to be in operation, as the identification value of the primary server device 20 for the following order number. For example, the next primary suggester 61 may perform confirmation of any server device 20 in operation based on a vote received by the vote receiver 42. Alternatively, the next primary suggester 61 may perform confirmation of any server device 20 in operation through communication with another server device 20 to check its live status. Accordingly, the next primary suggester 61 can specify a server device 20 in operation (in other words, a server device 20 that is not failed) as a primary server device.

The multiplex system 10 can complete communication of votes between the server devices 20 in one reciprocation in the best case by specifying a server device 20 in operation as a primary server device 20. Thus, the multiplex system 10 can efficiently execute the ordered multicasting through the specification of a server device 20 in operation as a primary server device 20.

For example, the next primary suggester 61 may generate, as the identification value of the primary server device 20 for the following order number, a value for identifying the server device 20 in which the number of accumulated pieces of unprocessed input data stored in the undetermined data storage 41 is equal to or larger than a reference value. In this case, for example, the next primary suggester 61 may be notified of the number of accumulated pieces of unprocessed input data through communication with another server device 20 to detect the server device 20 in which the number of accumulated pieces of unprocessed input data is equal to or larger than the reference value.

In the multiplex system 10, the ordered multicasting can be executed most efficiently when the primary server device 20 has received input data from the client device. Thus, in the multiplex system 10, the next primary suggester 61 suggests, as the primary server device 20, the server device 20 having a large number of accumulated pieces of unprocessed input data, thereby allowing efficient processing of accumulated input data.

Third Embodiment

Figure 13:
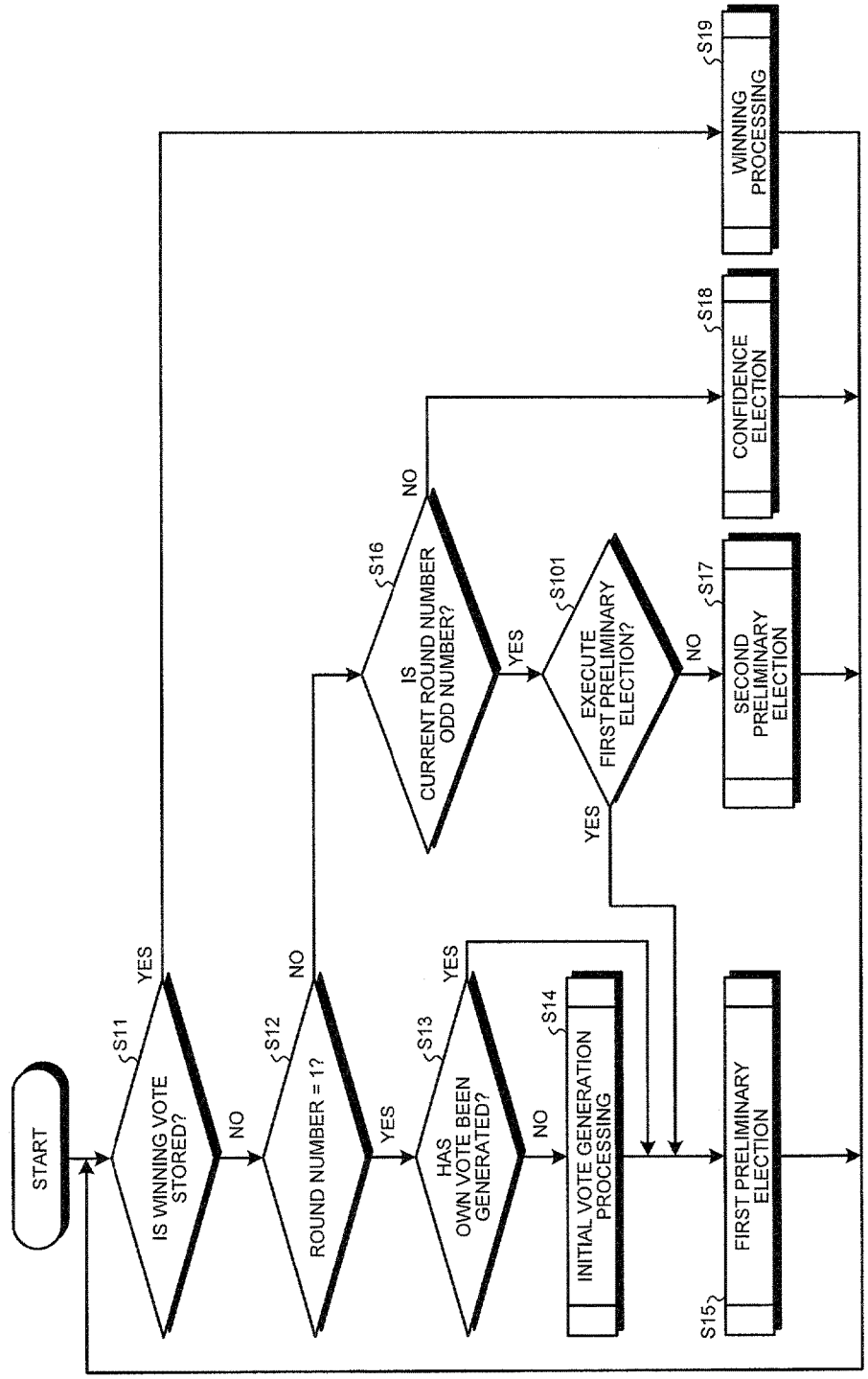
FIG. 13 is a flowchart of processing at the ordering device 32 according to a third embodiment.

FIG. 13 is a flowchart of processing at the ordering device 32 according to a third embodiment. The multiplex system 10 according to the third embodiment has a function and a configuration substantially identical to those of the first embodiment and the second embodiment described with reference to FIGS. 1 to 12, and thus any member having a substantially identical function is denoted by an identical reference numeral, and description thereof will be omitted.

The controller 57 according to the first embodiment and the second embodiment causes the first preliminary elector 53 to execute processing if the current round number has the initial value. Additionally, the controller 57 according to the third embodiment causes the first preliminary elector 53 to execute processing if the current round number is a predetermined value after processing at the confidence elector 55.

For example, as illustrated in FIG. 13, if the current round number is an odd number other than one (Yes at S16), the controller 57 advances the process to step S101. At step S101, the controller 57 determines whether to execute the first preliminary election.

If it is determined to execute the first preliminary election (Yes at S101), the controller 57 advances the process to step S15, and calls the first preliminary elector 53 to execute the first preliminary election. If it is determined not to execute the first preliminary election (No at S101), the controller 57 advances the process to step S17 and calls the second preliminary elector 54 to execute the second preliminary election.

For example, if division of the round number by four yields a remainder of one, the controller 57 may execute the first preliminary election (S15), and may execute the second preliminary election (S17) if division of the round number by four yields a remainder of three. Alternatively, the controller 57 may execute the first preliminary election (S15) if the round number is equal to or smaller than a predetermined value (for example, an integer equal to or larger than three), and may execute the second preliminary election (S17) if the round number is larger than the predetermined value. The determination at step S101 of whether to execute the first preliminary election or the second preliminary election provides a result identical among all server devices 20.

In the multiplex system 10 according to the third embodiment, the first preliminary election is executed also at a round other than the initial round, and thus each server device 20 can generate the winning-assuring vote even when the nomination vote at a round other than the initial round is acquired from the primary server device 20. Thus, the ordered multicasting can be executed more efficiently in the multiplex system 10 according to the third embodiment in some cases.

The following proof will be made on the validity of maintaining the consistency of the ordered multicasting in the multiplex system 10 according to the third embodiment.

Lemma 5: When a winning vote x is determined by the confidence election, votes at a following round have values equal to the value of x.

[Proof]

According to Lemma 3, the values of all nomination votes used in the preliminary election following the confidence election at which x is determined are equal to the value of x. The values of votes at the next round determined by election are any of the values of votes at the previous round, and thus, the values of votes at the next round are identical when all values of votes at the previous round are identical. Thus, by mathematical induction, the values of votes at a following round are equal to the value of x.

[QED]

According to Lemma 2 and Lemma 5, the winning votes have identical values even at different rounds. In other words, when r represents a round at which the winning votes are obtained for the first time, the winning votes at a round following round r have identical values. This proves that the consistency of multiplexing is guaranteed in the algorithm according to the present embodiment.

The third embodiment is generalization of the first embodiment. Thus, the first embodiment can be regarded as a special case of the third embodiment. However, the property that the number of times of vote transmission along the shortest paths is one reciprocation is obtained only in the case in which the first preliminary election is performed at the initial round.

The shortest paths are not changed by the first preliminary election at a round following the third round. Instead, results of the first preliminary election are always the substitution votes when the primary server device 20 is not in operation, a path is longer by a length corresponding to two rounds (=one reciprocation). Thus, when the non-blocking property is given priority at generation of failure, similarly to the first embodiment, the second preliminary election is preferably used at all rounds following the third round.

In contrast, when the primary server device 20 is in operation, it is possible that the first preliminary election, in which the winning-assuring vote can be generated only by a vote from the primary server device 20, can achieve higher efficiency than the second preliminary election, in which winning is assured by a majority vote.

Figure 14:
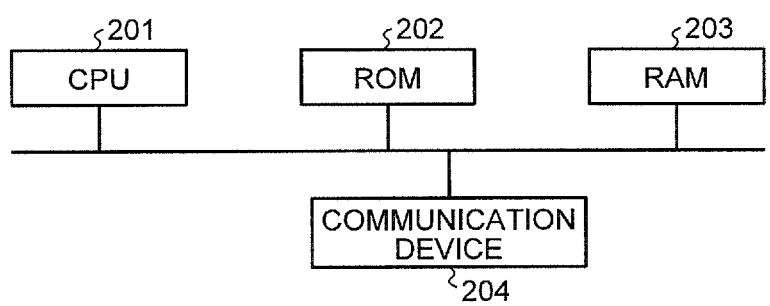
FIG. 14 is a diagram illustrating a hardware configuration of the server device 20 according to an embodiment.

FIG. 14 is a diagram illustrating a hardware configuration of the server device 20 according to an embodiment. The server device 20 includes a central processing unit (CPU) 201, a read only memory (ROM) 202, a random access memory (RAM) 203, and a communication device 204. These components are connected with each other through a bus.

The CPU 201 is a processor configured to execute, for example, arithmetic processing and control processing in accordance with a computer program. The CPU 201 uses a predetermined region of the RAM 203 as a work area, and executes various kinds of processing in cooperation with various computer programs stored in, for example, a recording medium in advance, thereby achieving the function of the ordering device 32 (the elector 46 including the round manager 51, the initial vote generator 52, the first preliminary elector 53, the second preliminary elector 54, the confidence elector 55, the winning processor 56, and the controller 57, and the primary specifier 45) included in the server device 20, and the function of the data processor 33.

The ROM 202 stores therein in an unwritable manner, for example, a computer program and various kinds of setting information used in control of the server device 20. The RAM 203 is a volatile storage medium such as a synchronous dynamic random access memory (SDRAM). The RAM 203 serves as the work area of the CPU 201. Specifically, the RAM 203 stores therein data executed by the server device 20, and serves as, for example, the undetermined data storage 41, the vote storage 43, and the determined data storage 47 in the ordering device 32.

The communication device 204 communicates with an external device (the client device, another server device 20, or the like). The communication device 204 serves as, for example, the data receiver 31, the data transmitter 34, and the vote receiver 42 and the vote transmitter 44 in the ordering device 32.

The server device 20 is not limited to such a configuration. At least part of the data receiver 31, the ordering device 32, the data processor 33, and the data transmitter 34 may be instead implemented by hardware circuitry (for example, semiconductor integrated circuits).

A computer program executed by the server device 20 according to the present embodiment is recorded and provided as a file in an installable or executable format in a computer-readable recording medium, which may be provided as a computer program product, such as a CD-ROM, a flexible disk, a CD-R, or a Digital Versatile Disk (DVD).

Alternatively, the computer program executed by the server device 20 according to the present embodiment may be stored in a computer connected to a network such as the Internet, and provided by downloading through the network. Alternatively, the computer program executed by the server device 20 according to the present embodiment may be provided or distributed through a network such as the Internet. Alternatively, the computer program executed by the server device 20 according to the present embodiment may be incorporated in advance and provided in a ROM or the like.

The computer program executed by the server device 20 according to the present embodiment has a module configuration including the above-described components of the server device 20 (the ordering device 32 (the elector 46 including the round manager 51, the initial vote generator 52, the first preliminary elector 53, the second preliminary elector 54, the confidence elector 55, the winning processor 56, and the controller 57, and the primary specifier 45), and the data processor 33). The CPU 201 (processor) reads the computer program in, for example, the storage medium and executes the computer program, whereby above-described components are loaded onto the RAM 203. As a result, the server device 20 (the ordering device 32 and the data processor 33) is generated on the RAM 203.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A computer in a multiplex system that includes a plurality of computers each executing identical processing on a plurality of pieces of data in an identical order, the computer comprising:
   one or more processors that execute instructions to perform operations, comprising:
   receiving the plurality of pieces of data;
   data processing the plurality of pieces of data to form a processed plurality of pieces of data in a processing order;
   transmitting the processed plurality of pieces of data, wherein the data processing further comprises:
   managing a current order number and a current round number;
   causing a first preliminary election by,
      in a first case in which a vote order number is identical to the current order number, a round number is identical to the current round number, and a selection state is a nominated state acquired from a primary computer among the plurality of computers, generating a generated vote that includes data included in a vote acquired from the primary computer, the current order number, a round number following the current round number, and a winning-assured state, outputting the generated vote to the plurality of computers, and
      incrementing the current round number to a next value;
   causing a confidence election by, in a second case in which the vote order number is identical to the current order number, the round number is identical to the current round number, and the selection state is the winning-assured state that is acquired for identical data from each of a first threshold or more of the plurality of computers, determining data included in the vote acquired from each of the first threshold or more of the plurality of computers to be data to be processed at the current order number; and
   processing data according to the order number.

2. The computer according to claim 1, the operations further comprise causing a second preliminary election by
   in a third case in which no vote is generated by the first preliminary election, and the vote order number is identical to the current order number, the round number is identical to the current round number, and the selection state is a nominated state that is acquired for identical data from each of a majority of the plurality of computers, the generated vote includes data included in the vote acquired from the majority of the plurality of computers, the current order number, a round number following the current round number, and the winning-assured state,
   outputting the generated vote to the plurality of computers, and
   incrementing the current round number to a next value.

3. The computer according to claim 2, wherein the operations further comprise generating an initial vote by
   generating, when the current round number has an initial value, the generated vote that includes first data, the current order number, the current round number, and the nominated state, and
   outputting the generated vote to the plurality of computers, wherein
   the first data is data that is received from outside and an order which is not determined, or data included in the vote order number that is identical to the current order number and the round number is the initial value.

4. The computer according to claim 3, wherein causing the confidence election further comprises
   generating, in the second case, the generated vote that includes data included in the vote acquired from each of the first threshold or more of the plurality of computers, the current order number, and a winning state,
   outputting the generated vote to the plurality of computers,
   incrementing the current order number to a next value, and
   setting the current round number back to the initial value.

5. The computer according to claim 4, wherein the operations further comprise identifying a winning processor that executes instructions to perform additional operations comprising: when the vote order number is identical to the current order number and the selection state is a winning state acquired from any of the plurality of computers, determining data included in the generated vote, wherein the selection state is the winning state, and wherein the data represents data to be processed at the current order number.

6. The computer according to claim 2, wherein the causing of the second preliminary election further comprises:
when the vote order number is identical to the current order number and the round number is identical to the current round number acquired from each of a second threshold or more of the plurality of computers not in the third case, generating the generated vote that includes data included in any of the acquired votes, the current order number, the round number following the current round number, and a substitution state,
outputting the generated vote to the plurality of computers, and
incrementing the current round number to the next value.

7. The computer according to claim 2, wherein the operations further comprise causing any one of the first preliminary election, the second preliminary election, and the confidence election to execute processing for each current round number, wherein the causing further comprises:
in response to the confidence election, executing processing when the current round number is a value following a round number at which any of the first preliminary election and the second preliminary election has caused execution of the processing, and
in response to the first preliminary election, executing processing when the current round number has an initial value.

8. The computer according to claim 2, wherein the operations further comprise causing any one of the first preliminary election, the second preliminary election, and the confidence election to execute processing for each current round number, wherein the causing further comprises
in response to the confidence election, executing processing when the current round number is a value following a round number at which any of the first preliminary election and the second preliminary election has caused execution of the processing, and
in response to the first preliminary election, executing processing when the current round number has an initial value or has a predetermined value at which the confidence election does not cause execution of the processing.

9. The computer according to claim 1, wherein the causing of the first preliminary election further comprises
when the vote order number is identical to the current order number and the round number is identical to the current round number acquired from each of a second threshold or more of the plurality of computers not in the first case, generating the generated vote that includes data included in any of the acquired votes, the current order number, a round number following the current round number, and a substitution state,
outputting the generated vote to the plurality of computers, and
incrementing the current round number to a next value.

10. The computer according to claim 9, wherein the second threshold is n−f where n represents the number of the computers and f represents an allowable number of computers in failure.

11. The computer according to claim 1, wherein the causing of the confidence election further comprises:
in a fourth case in which the vote order number is identical to the current order number and the round number is identical to the current round number acquired from each of a second threshold or more of the plurality of computers not in the second case, generating the generated vote that includes data included in any of the acquired votes, the current order number, a round number following the current round number, and a nominated state,
outputting the generated vote to other computers, and
incrementing the current round number to a next value.

12. The computer according to claim 11, wherein the causing of the confidence election further comprises: when the votes acquired in the fourth case from each of the second threshold or more of the plurality of computers include the vote including the winning-assured state, generating the generated vote including data of the vote including the winning-assured state, the current order number, a round number following the current round number, and a nominated state,
outputting the generated vote to other computers, and
incrementing the current round number to a next value.

13. The computer according to claim 1, wherein the first threshold is f+1 where f represents an allowable number of computers in failure.

14. The computer according to claim 1, wherein the operations comprise causing a primary specifying of any one of the plurality of computers as a primary computer for each current order number.

15. The computer according to claim 14, wherein the primary specifying further comprises specifying, as the primary computer, one of the plurality of computers specified from the current order number by predetermined calculation.

16. The computer according to claim 15, wherein the operations further comprise:
generating an identification value of a primary computer for an order number following the current order number;
synthesizing input data with the identification value to output synthesized data as processing target data; and
separating data, based on a processing order, into the input data and the identification value to output the input data after separation as processing target data, wherein
the primary specifying specifies a computer identified by the identification value obtained by the separating, as the primary computer for an order number following the order number of the data the processing order of which is determined.

17. The computer according to claim 16, wherein the operations further comprise: generating a value for identifying the own computer, as the identification value of the primary computer for the following order number.

18. The computer according to claim 16, wherein the operations further comprise generating a value for identifying the computer confirmed to be in operation, as the identification value of the primary computer for the following order number.

19. The computer according to claim 16, wherein the operations further comprise generating a value for identifying a computer in which the number of accumulated pieces of unprocessed input data is equal to or larger than a reference value, as the identification value of the primary computer for the following order number.

20. A data processing device comprising:
the computer according to claim 1; and
a processor configured to process the pieces of data in the processing order determined by the computer.

21. An ordering method for determining a processing order of a plurality of pieces of data communicated among a plurality of computers, the method being executed by a computer in a multiplex system that includes the computers each executing identical processing on the pieces of data in an identical order, the method comprising:
receiving the plurality of pieces of data;
data processing the plurality of pieces of data to form a processed plurality of pieces of data in a processing order;
transmitting the processed plurality of pieces of data, wherein the data processing further comprises:
managing a current order number and a current round number;
in a first case in which a vote order number is identical to the current order number, a round number is identical to the current round number, and a selection state is a nominated state acquired from a primary computer among the computers, generating a generated vote that includes data included in a vote acquired from the primary computer, the current order number, a round number following the current round number, and a winning-assured state;
outputting the generated vote to the plurality of computers;
incrementing the current round number to a next value;
in a second case in which the vote order number is identical to the current order number, the round number is identical to the current round number, and the selection state is the winning-assured state acquired for identical data from each of a first threshold or more of the plurality of computers, determining data included in the vote acquired from each of the first threshold or more of the plurality of computers to be data to be processed at the current order number; and
processing data according to the order number.

22. A computer program product comprising a non-transitory computer-readable medium containing a program, wherein the program, when executed by a computer, causes the computer to execute an ordering method, comprising:
receiving a plurality of pieces of data;
data processing the plurality of pieces of data to form a processed plurality of pieces of data in a processing order;
transmitting the processed plurality of pieces of data, wherein the data processing further comprises:
managing a current order number and a current round number;
in a first case in which a vote order number is identical to the current order number, a round number is identical to the current round number, and a selection state is a nominated state acquired from a primary computer among a plurality of computers, generating a generated vote that includes data included in a vote acquired from the primary computer, the current order number, a round number following the current round number, and a winning-assured state;
outputting the generated vote to the plurality of computers;
incrementing the current round number to a next value;
in a second case in which the vote order number is identical to the current order number, the round number is identical to the current round number, and the selection state is the winning-assured state acquired for identical data from each of a first threshold or more of the plurality of computers, determining data included in the vote acquired from each of the first threshold or more of the plurality of computers to be data to be processed at the current order number; and
processing data according to the order number.

23. A multiplex system comprising a plurality of computers each executing identical processing on a plurality of pieces of data in an identical order, wherein
each computer includes
a processor that executes instructions to perform operations, comprising:
communicating the pieces of data among the plurality of computers and determining a processing order of the pieces of data; and
processing the pieces of data in the processing order,
managing a current order number and a current round number;
causing a first preliminary election by,
in a first case in which a vote order number is identical to the current order number, a round number is identical to the current round number, and a selection state is a nominated state acquired from a primary computer among the plurality of computers, generating a generated vote that includes data included in a vote acquired from the primary computer, the current order number, a round number following the current round number, and a winning-assured state,
outputting the generated vote to the plurality of computers, and
incrementing the current round number to a next value;
causing a confidence election by, in a second case in which the vote order number is identical to the current order number, the round number is identical to the current round number, and the selection state is the winning-assured state acquired for identical data from each of a first threshold or more of the plurality of computers, determining data included in the vote acquired from each of the first threshold or more of the plurality of computers to be data to be processed at the current order number; and
processing data according to the order number.

* * * * *